(12) United States Patent
Duncan

(10) Patent No.: US 10,682,963 B1
(45) Date of Patent: Jun. 16, 2020

(54) ACCESSORY FOR A RECREATIONAL VEHICLE

(71) Applicant: DASH CADDIE, LLC, New Bern, NC (US)

(72) Inventor: Jefferson William Duncan, Trentwoods, NC (US)

(73) Assignee: DASH CADDIE, LLC, New Bern, NC (US)

( * ) Notice: Subject to any disclaimer, the term of this patent is extended or adjusted under 35 U.S.C. 154(b) by 0 days.

(21) Appl. No.: 15/921,932

(22) Filed: Mar. 15, 2018

Related U.S. Application Data

(60) Provisional application No. 62/471,620, filed on Mar. 15, 2017.

(51) Int. Cl.
*B60R 7/04* (2006.01)
*B60R 7/06* (2006.01)
*B60R 11/00* (2006.01)
*B63B 29/00* (2006.01)

(52) U.S. Cl.
CPC ............... *B60R 7/06* (2013.01); *B60R 7/04* (2013.01); *B60R 11/00* (2013.01); *B60R 2011/0005* (2013.01); *B60R 2011/0007* (2013.01); *B60Y 2200/86* (2013.01); *B63B 29/00* (2013.01)

(58) Field of Classification Search
CPC ............... B65D 51/28; B65D 51/2807; B65D 21/0237; B65D 43/02; B65D 1/36; B60R 11/00; B60R 2011/0043; B60R 7/04; B60R 7/084; B60N 3/002; B60N 3/005; B60N 3/102; Y10S 224/926; A47G 19/2272
See application file for complete search history.

(56) References Cited

U.S. PATENT DOCUMENTS

| | | | | |
|---|---|---|---|---|
| 4,040,549 A * | 8/1977 | Sadler | ................... | B60N 3/103 215/376 |
| 4,732,274 A * | 3/1988 | Bouton | ................ | A47G 19/065 206/1.7 |
| 5,176,283 A * | 1/1993 | Patterson | ............... | A47G 19/06 206/217 |
| 5,960,982 A * | 10/1999 | Perlis | ................... | A47G 19/065 206/558 |
| 6,425,480 B1 * | 7/2002 | Krueger | ............... | A47G 19/065 206/217 |
| 6,732,990 B2 * | 5/2004 | Hudson | ................. | B60N 3/002 206/503 |
| 8,256,639 B1 * | 9/2012 | Samuelson | ............ | B60N 3/103 220/23.4 |

(Continued)

OTHER PUBLICATIONS

Lakeside Collection "divided food storage plates", copyright 2015 https://www.amazon.com/Set-Divided-Food-Storage-Plates/dp/B071KWQZ1W (Year: 2015).*

(Continued)

*Primary Examiner* — Brian D Nash
(74) *Attorney, Agent, or Firm* — MacCord Mason PLLC

(57) ABSTRACT

Devices, assemblies, kits and methods for an accessory for a recreational vehicle are shown and described. An accessory may include a tray, an extension and a cover for the tray. The tray may be a horizontally oriented tray supported by the support and having a set of compartments and a set of recesses. The tray may be mountable between variable positions.

17 Claims, 20 Drawing Sheets

(56) References Cited

U.S. PATENT DOCUMENTS

| | | | | |
|---|---|---|---|---|
| 8,381,935 B1* | 2/2013 | Buck | A47G 19/2205 | 220/254.4 |
| 8,590,730 B2* | 11/2013 | Buck | B65D 81/3205 | 220/23.83 |
| 8,672,175 B2* | 3/2014 | Farmer | B65D 1/36 | 220/737 |
| 8,939,312 B1* | 1/2015 | Buck | A47G 19/065 | 220/212 |
| 8,973,776 B1* | 3/2015 | Buck | A47G 19/2272 | 220/521 |
| 9,078,535 B1* | 7/2015 | Buck | A47G 19/2205 | |
| 9,181,009 B1* | 11/2015 | Buck | A47G 19/2272 | |
| 9,265,370 B2* | 2/2016 | Kellow, Jr. | A47G 19/065 | |
| 9,783,349 B2* | 10/2017 | Buck | B65D 21/0223 | |
| 9,796,316 B1* | 10/2017 | Siqueira | B60N 3/106 | |
| 2006/0016719 A1* | 1/2006 | Cassese | A47G 19/06 | 206/564 |
| 2006/0118453 A1* | 6/2006 | Hillebrecht | A47G 19/065 | 206/562 |
| 2007/0278122 A1* | 12/2007 | McCumber | B65D 81/3294 | 206/514 |
| 2008/0164168 A1* | 7/2008 | Gramoy | B60N 3/10 | 206/316.1 |
| 2009/0020450 A1* | 1/2009 | Heneghan | B60N 3/002 | 206/567 |
| 2011/0036881 A1* | 2/2011 | Higgs | A63B 47/00 | 224/274 |
| 2013/0153578 A1* | 6/2013 | Mansell | B65D 5/3628 | 220/556 |
| 2013/0170682 A1* | 7/2013 | Conrad | H04R 1/028 | 381/332 |
| 2015/0216338 A1* | 8/2015 | Shendelman | A47G 19/065 | 220/574 |
| 2016/0229348 A1* | 8/2016 | Farooq | B60R 7/046 | |
| 2016/0324371 A1* | 11/2016 | Herrera, Jr. | A47J 47/02 | |
| 2017/0008438 A1* | 1/2017 | Clark | B60N 2/64 | |
| 2017/0043724 A1* | 2/2017 | Chen | B60R 7/04 | |
| 2017/0172328 A1* | 6/2017 | Shendelman | A47G 19/065 | |
| 2017/0349105 A1* | 12/2017 | Karrer | B60R 7/043 | |
| 2017/0362001 A1* | 12/2017 | Buck | A47G 19/2272 | |
| 2018/0079567 A1* | 3/2018 | Engel | B65D 51/28 | |
| 2019/0031397 A1* | 1/2019 | Grove | B65D 21/0237 | |
| 2019/0142196 A1* | 5/2019 | Barnum | A47G 23/0641 | |

OTHER PUBLICATIONS

Gadget Flow "Cup Holder Swivel Tray", published Mar. 12, 2015 https://thegadgetflow.com/portofolio/cup-holder-swivel-tray/ (Year: 2015).*

* cited by examiner

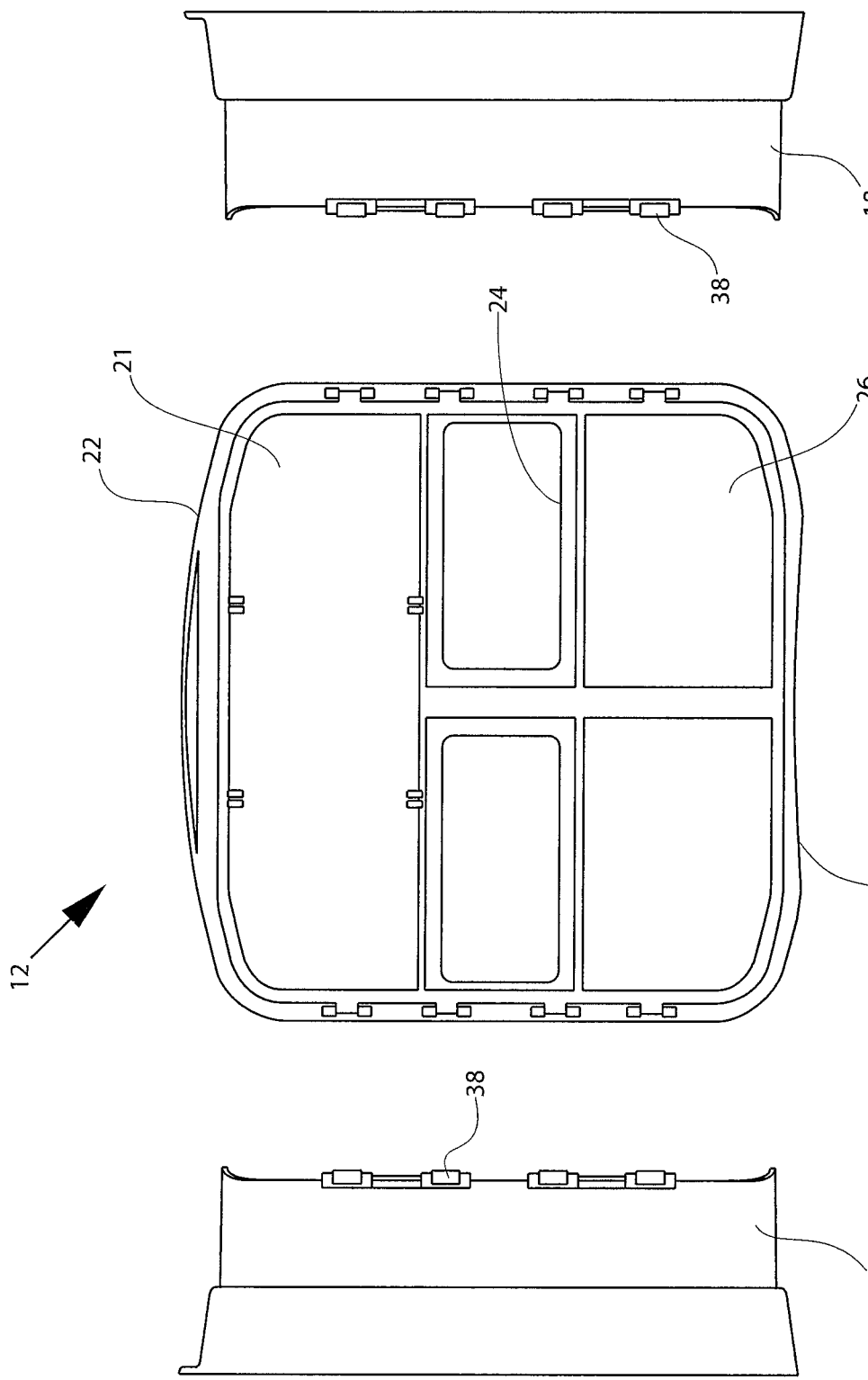

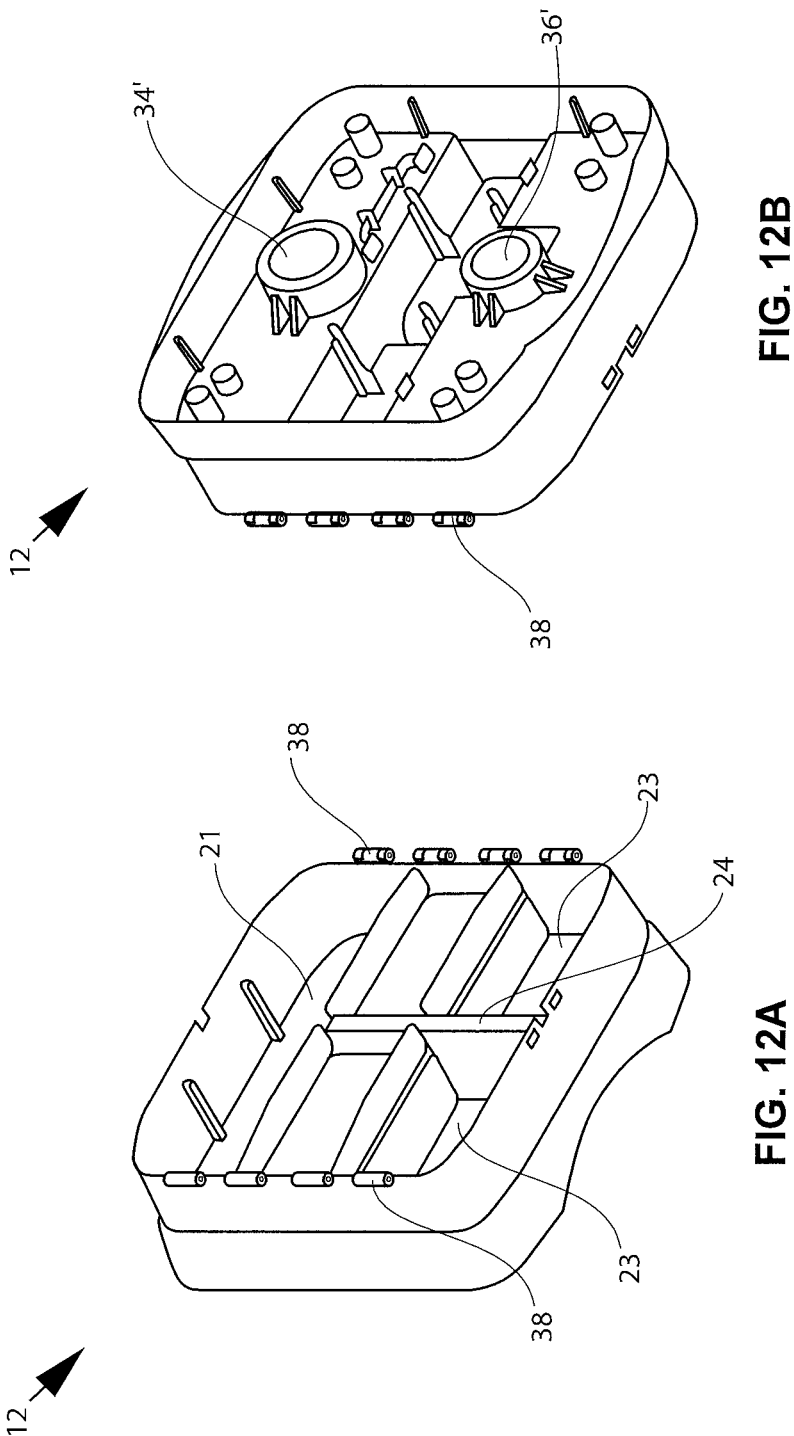

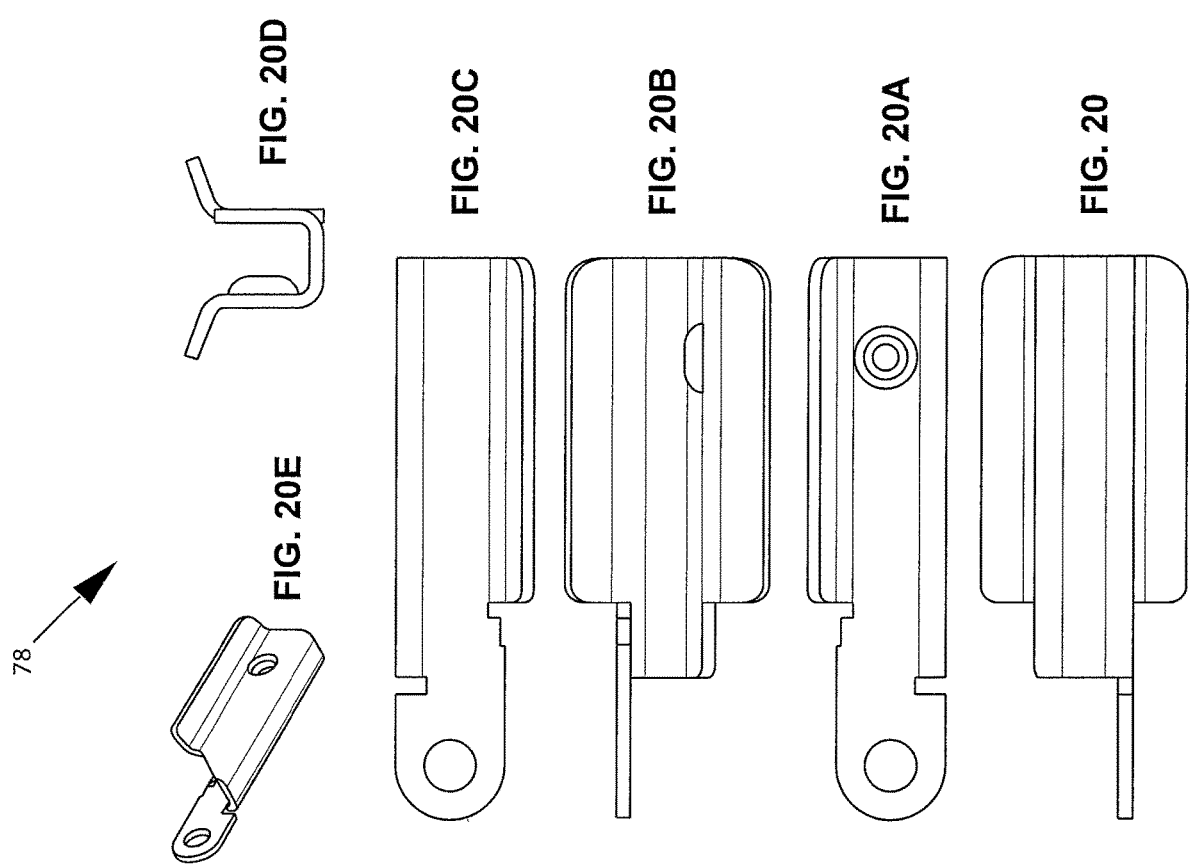

ACCESSORY FOR A RECREATIONAL VEHICLE

FIELD OF THE TECHNOLOGY

The present disclosure relates generally to a recreational vehicle accessory, and more particularly to an improved portable accessory adapted to removably mate and secure about a dashboard.

BACKGROUND

Recreational vehicles, such as by way of example, golf carts, boats, RVs, and utility side-by-side vehicles, may include some type of cubby for storage. Conventionally, these cubbies are not conveniently located on the recreational vehicle and require stopping the vehicle, dismounting from the vehicle and/or reaching to awkward locations for items stored in such cubbies. Additionally, such cubbies are often odd shaped and do not keep the drivers items secure, especially, for activities such as off-road driving, stop and go driving, and/or driving in rough, uneven or unpaved terrain.

In instances utilizing golf carts, such as golf outings, participants often carry multiple tools, for example, tees, range locators, golf balls, hand towels, etc, that need to be easily accessible for repeated usage. The cubbies on golf carts are not convenient or structured for such use and tools and items such as a drivers' licenses, wallets, cellular phones, and/or purses may shuffle around out of sight and be forgotten when the golf outing is completed.

Therefore, Applicant desires systems and methods for a recreational vehicle accessory without the drawbacks presented by the traditional systems and methods. Further, Applicant desires a portable accessory tray for securing items therein and configured to be portable and mountable between various recreational vehicles.

SUMMARY

In accordance with the present disclosure, accessory devices for use with recreational vehicles are provided for portable storage of items. This disclosure provides improved accessory systems, devices, and methods that are convenient, efficient, portable and safe for the user, particularly when used with recreational vehicles and the like.

One embodiment of the present disclosure includes a recreational vehicle accessory including: a tray, an extension, and an adaptor. In some examples, the adaptor may interface with the recreational vehicle and the extension.

In some examples, the accessory may include a cover for covering said tray. The cover may be a partial cover. The cover may be a split cover.

The tray may include a compartment. The tray may include a set of compartments.

Another embodiment of the disclosure, in a golf cart having a dashboard, an accessory adapted to removably mate about said dashboard, including: a tray, a set of compartments in the tray, an extension and an adaptor. The adaptor may interface with the recreational vehicle about the dashboard on one end and with the extension on a second end.

In particular examples, the accessory may include an accessory fixture.

Still in another embodiment of the present disclosure the tray may include a full compartment, a subcompartment, and/or a midsize compartment. The full compartment, sub-compartment and/or midsize compartment may make up a set of compartments in any combination.

A kit may include an accessory including a tray, an extension, and an adaptor.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIGS. 10-10B shows various views of examples of a tray and cover of a recreational vehicle accessory according to an embodiment of the disclosure;

FIGS. 12A-B are additional top and bottom views of examples of a tray of a recreational vehicle accessory according to embodiments of the disclosure;

FIGS. 15-15C are various exploded views of alternate examples of an extension of a recreational vehicle accessory according to an embodiment of the disclosure;

FIGS. 16 and 16A are is various exploded views of one example of an upper portion of an extension of a recreational vehicle accessory according to an embodiment of the disclosure;

FIGS. 17-17C are various views of examples of a pad of a recreational vehicle accessory according to an embodiment of the disclosure;

FIGS. 20-20E are various views of examples of a pivot bracket of a recreational vehicle accessory according to an embodiment of the disclosure.

DESCRIPTION OF EMBODIMENTS

Figure 1:
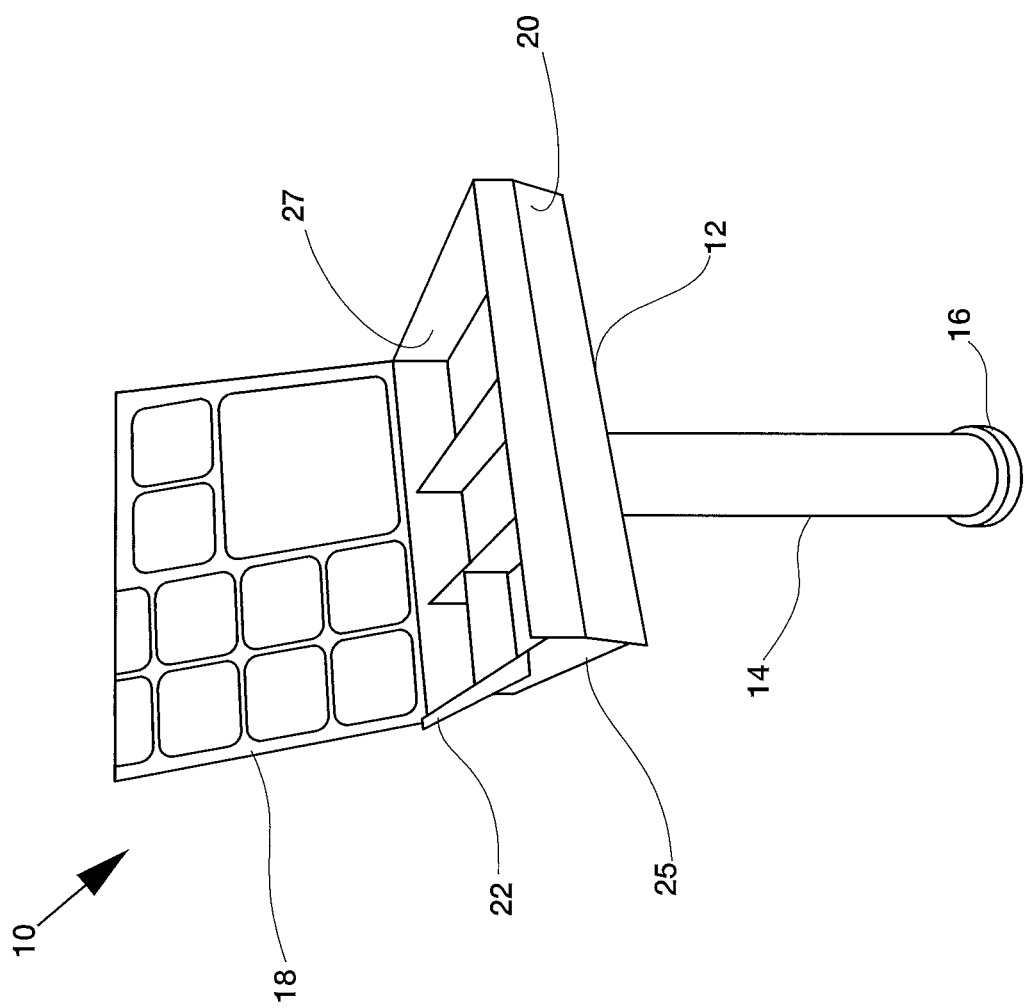
FIG. 1 is a front perspective view of one example of a recreational vehicle accessory according to an embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
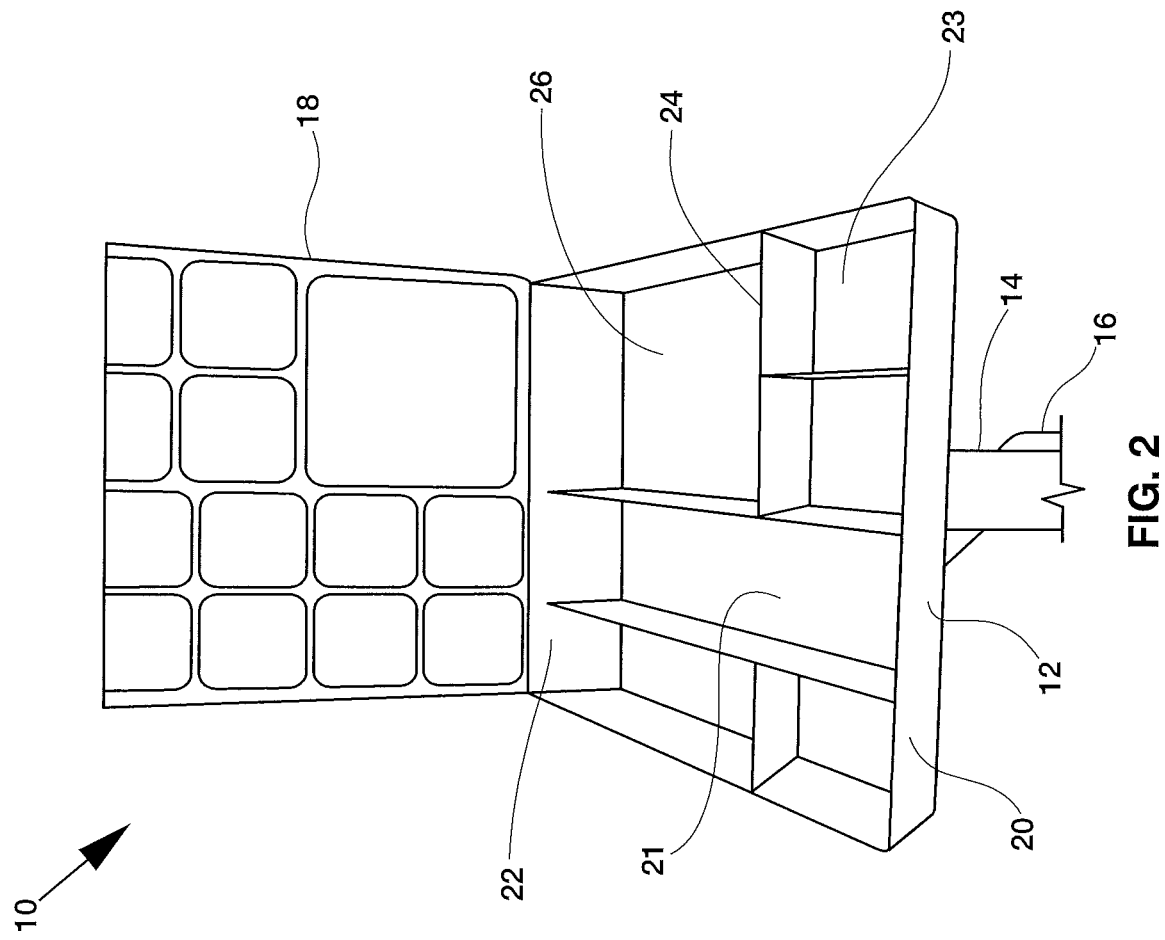
FIG. 2 is a top perspective view of one example of a recreational vehicle accessory according to an embodiment of the disclosure.
Figure 3:
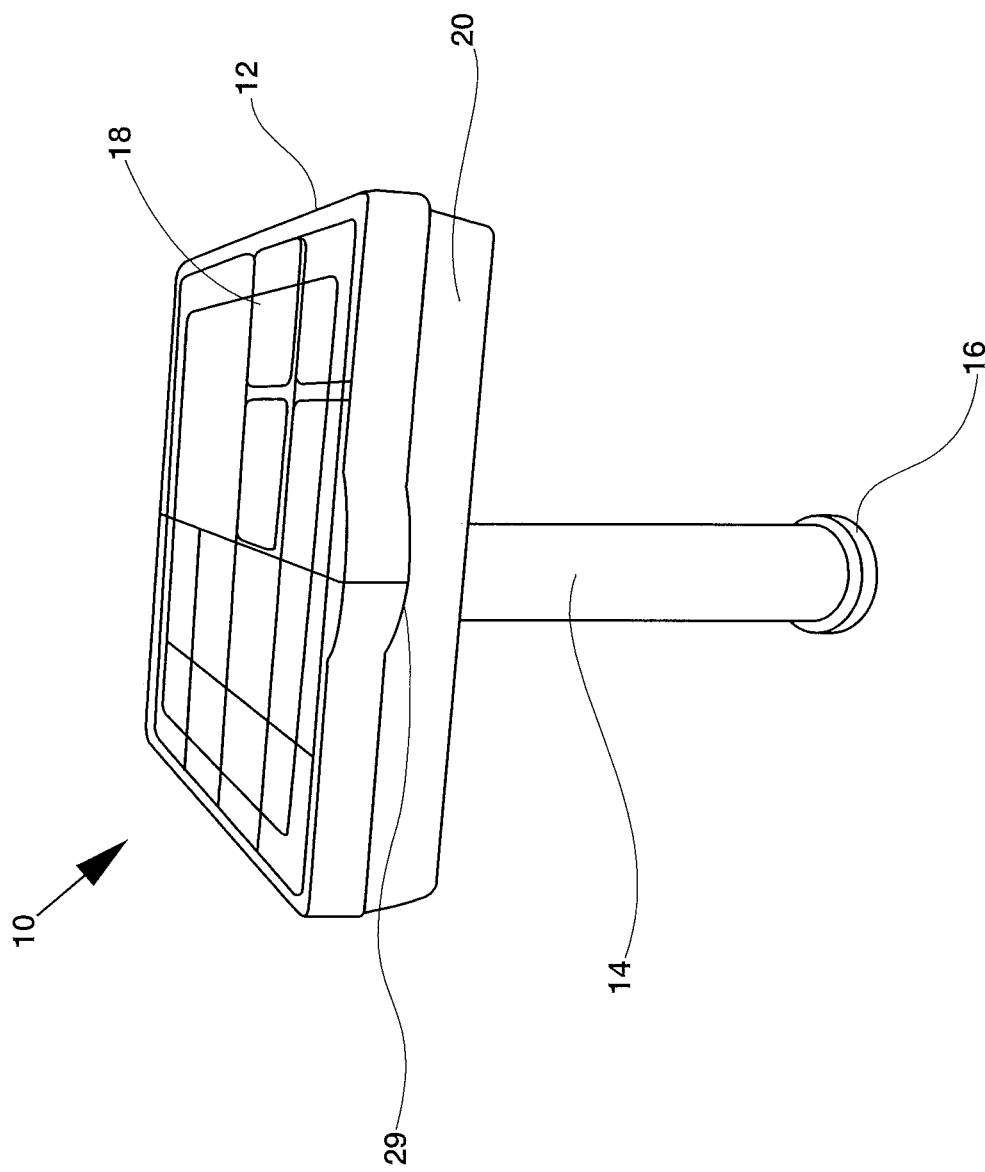
FIG. 3 is a front perspective view of one example of a recreational vehicle accessory with a closed cover according to an embodiment of the disclosure.

Referring now to the drawings in general and FIG. 1 in particular, it will be understood that the illustrations are for the purpose of describing embodiments of the disclosure and are not intended to limit the disclosure or any invention thereto. As best seen in FIGS. 1, 2 and 3, a recreational vehicles accessory, also known as a an accessory caddy, 10 is shown embodied according to the present disclosure. Accessory 10 may include a tray 12, an extension 14 and an adaptor 16. The adaptor 16 may interface with the recreational vehicle and with the extension 14.

The accessory 10 may include a cover 18 for covering the tray. The cover 18 may be a full cover, a divided cover, a partial cover and/or a split cover, by way of example. The cover 18 may be attached to the tray 12. The cover 18 may be removable from the tray 12. The cover 18, by way of example, may be hinged on one side of the tray 12. The cover may be made, by way of example, of PVC plastics, metals and/or wood.

The tray may include a first side wall 25, a second side wall 27, a front wall 20 and a back wall 22. The tray 12 of the accessory 10 may also include a compartment housed within the walls. The tray 12 of accessory 10 may include a set of compartments. The set of compartments may include at least one full compartment 21 spanning from a wall of the tray to another wall of the tray. The set of compartments may include a subcompartment 23. The set of compartments may include at least two subcompartments 23. The at least two subcompartments may, in some examples, share a common dividing wall 24. The set of compartments may include a mid-size compartment 26. In some examples, the tray 12 may be made of PVC plastics, metals, and/or wood.

In some examples, the accessory may include a cover 18 for covering said tray. The cover 18 may be a partial cover. The cover may be a split cover.

The accessory 10 may include one or more securing mechanism 29. By way of example, the securing mechanism may include a latch, a snap, a magnet, a bungee cord type attachment, a biased edge and/or a hook.

Figure 4:
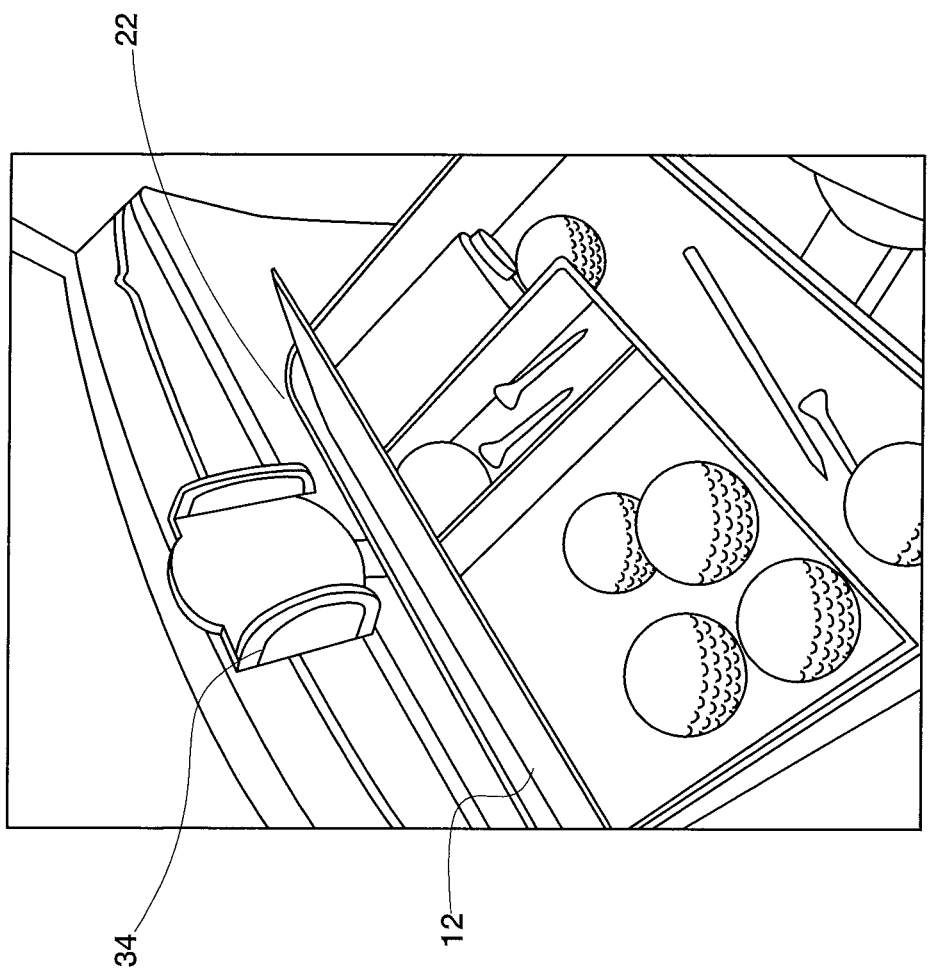
FIG. 4 is a top close-up view of one example of a tray of a recreational vehicle accessory according to an embodiment of the disclosure.

The accessory 10 may include attachments 34 (see FIG. 4) that mate with the accessory 10. By way of example, attachments 34 may extend from tray 12 and/or extension 14 and serve to secure items to tray 12. Examples of attachments include at least a shoe holder, a cell phone holder, a distance finder, a towel connection.

Figure 6:
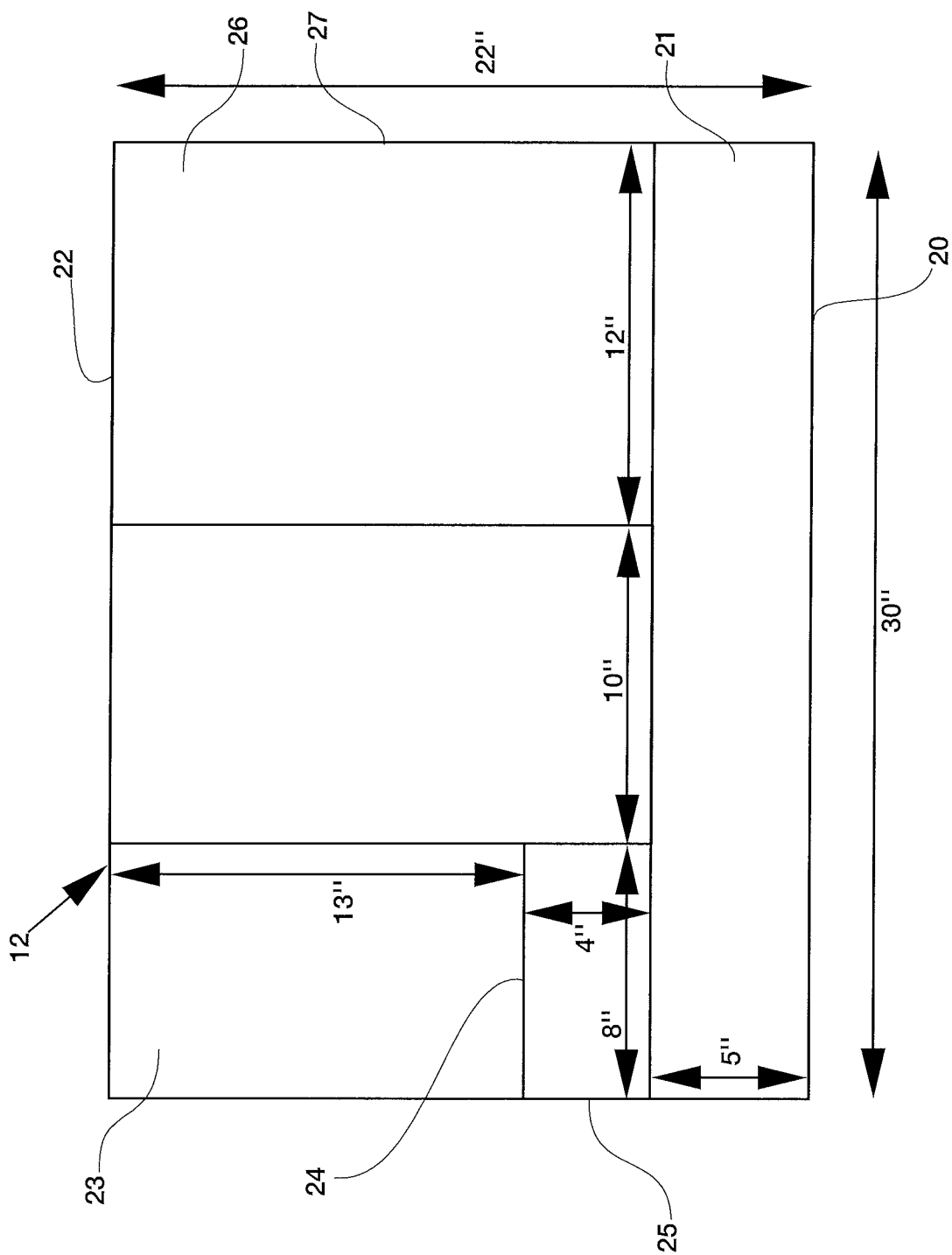
FIG. 6 is a close-up top view of one example of a set of compartments of the a tray of a recreational vehicle accessory according to an embodiment of the disclosure.
Figure 7:
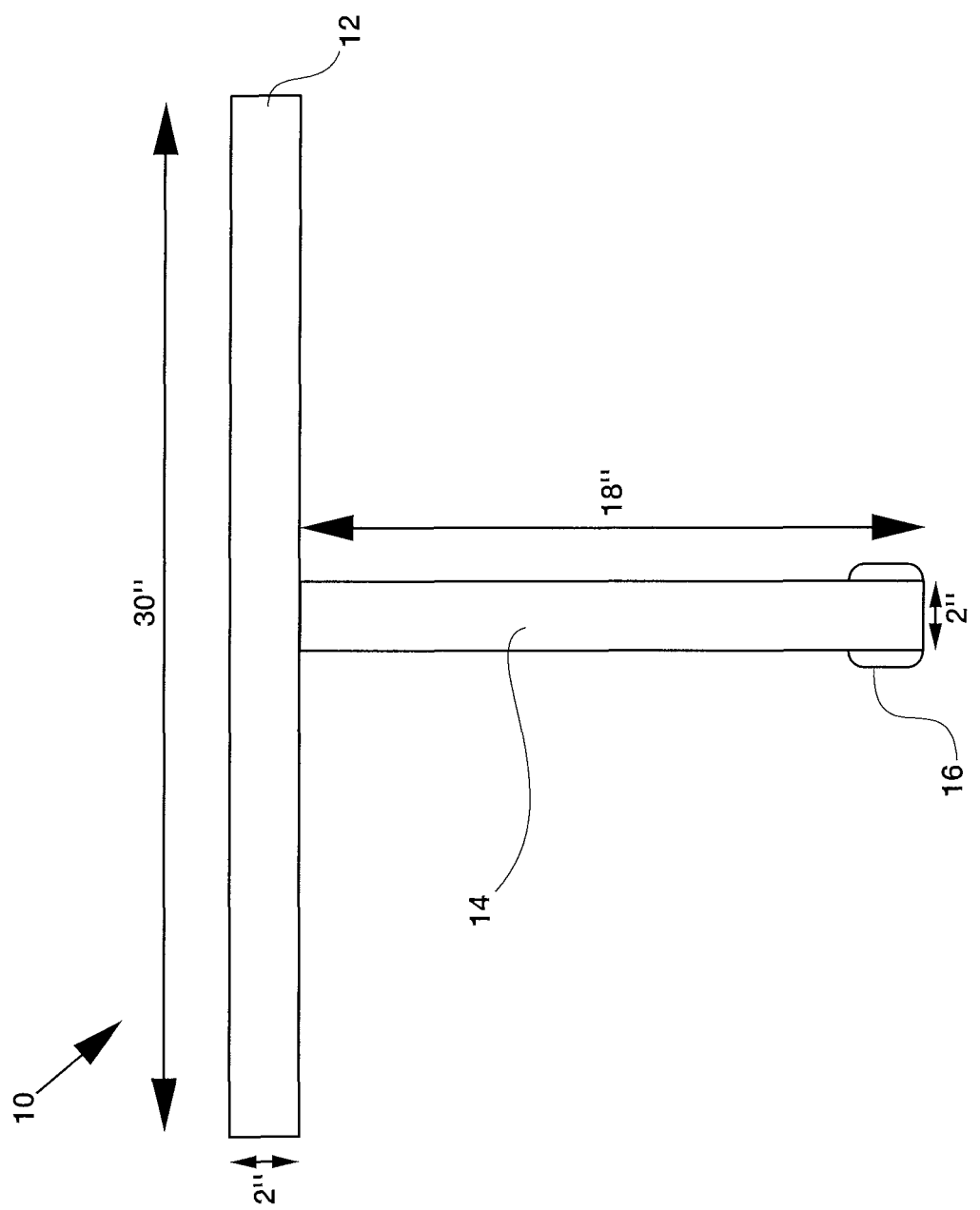
FIG. 7 is a front view of one example of a recreational vehicle accessory according to an embodiment of the disclosure.

FIG. 6 show an exemplary embodiment of a compartment system of tray 12. The compartment system may include compartments to encase typical items for a sport outing, by way of example, a phone sized compartment, a tee compartment, a compartment for a golf ball sleeve of 3 balls, a distance calculator compartment, and/or a GPS device compartment. Exemplary dimensions for a tray 12 and for tray compartments are shown and demonstrated. FIG. 7 shows a front view of one example of a recreational vehicle accessory 10 and dimensions demonstrated therein.

Figure 5A:
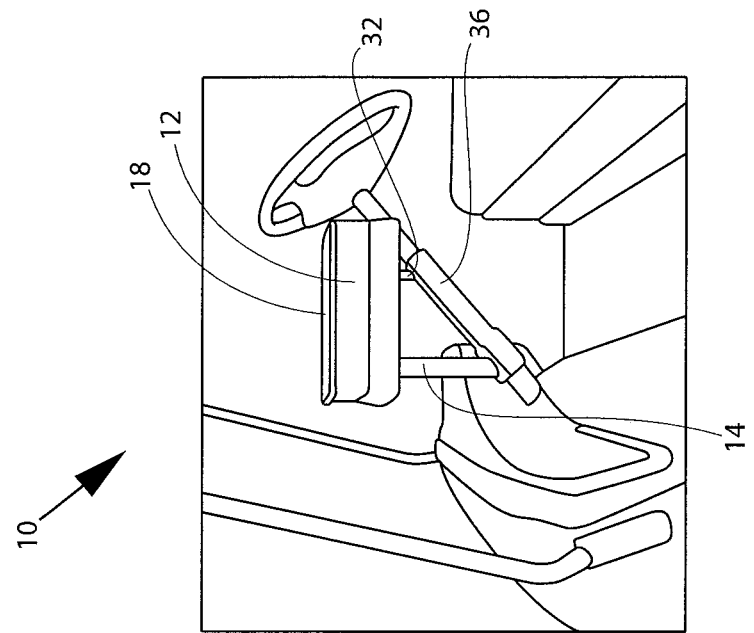
FIGS. 5-5A show a side view of examples of a recreational vehicle accessory having a cover according to embodiments of the disclosure.
Figure 5:
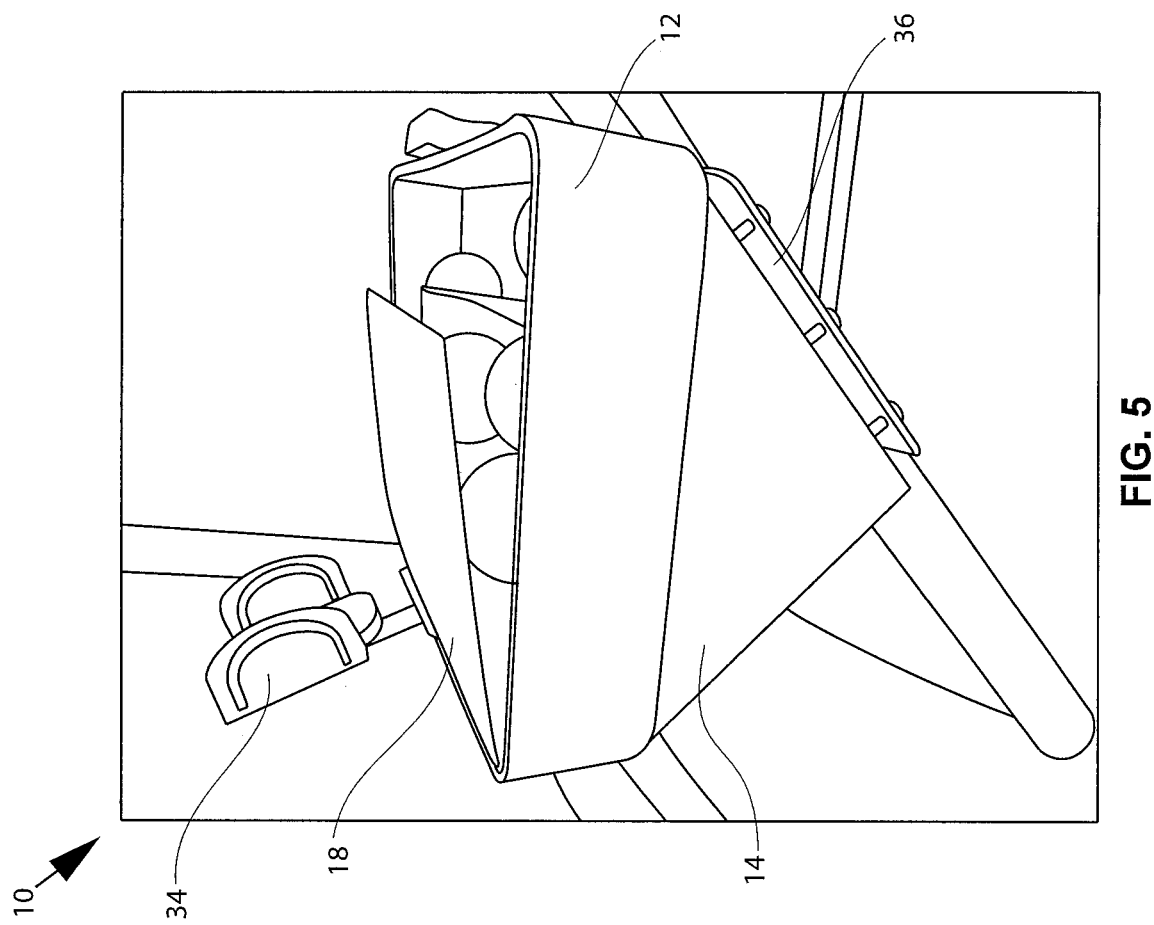

In some embodiments, the extension 14 has a length L, the length L mounting the tray 12 spaced apart from the recreational vehicle. In other examples, extension 14 may be a support (as shown in FIG. 5) for securing the tray 12 to the recreational vehicle. The extension support may be a wedge shaped support.

Adaptor 16 may secure the accessory 16 to a steering wheel assembly of a recreational vehicle (see FIG. 5). In some examples, the adaptor 16 secures the accessory 12 to a cup holder of the vehicle (see FIG. 1).

The accessory may be portable and mountable between recreational vehicles.

In a golf cart having a dashboard, an accessory 10 may be adapted to removably mate about the dashboard and includes a tray 12, a set of compartments in the tray, an extension 14, and an adaptor 16. The adaptor may interface with the recreational vehicle about the dashboard on one end and with the extension on a second end.

The extension 14 may include an extension length. The extension length may be structured for mounting the tray 12 spaced apart from the recreational vehicle. In other embodiments, the extension 14 is a support for securing the tray 12 to the recreational vehicle. The extension 14 serving as a support may be a wedge shaped support. The extension may be made of PVC plastics, metals, and/or wood, in some embodiments.

An adaptor 16 may be adapted to secure the accessory 10 to a steering wheel assembly. The adaptor 16 may be adapted, in some examples, to secure the accessory to a cup holder of the vehicle. The adaptor 16 may be adapted, in other examples, to secure the accessory to a dashboard of the vehicle. The adaptor may be constructed of PVC plastics, metals, and/or wood, in some examples.

The accessory 10 may be portable between recreational vehicles.

The accessory may include an accessory fixture attachment 34.

Some embodiments of the invention may include an accessory tray 12 wherein the extension is between about 4" and about 20" in length L. The tray may be between about 20" in length L and about 35" in length L. The tray 12 may be between about 18" in width W and about 26" in width W.

The tray 12 may be between about 1" in depth D and about 4" in depth D. The tray should be of a size to be portable and also be large enough to be able to accommodate typical items for a sport outing and items such as a wallet and/or a cellular phone. The tray should be self-supportable by way of the extension.

The tray may include a compartment. The tray may include a set of compartments.

The tray 12 may include a full compartment 21. The full compartment 21 may span a full length of the tray and be between about 4" and about 6" in width.

The tray 12 may include a midsize compartment 26. The midsize compartment 26 may be at least half the width of the width W of the tray.

The tray 12 may include a subcompartment 23. The subcompartment 23 may be less than half of the width of the width W of the tray and is less than half the length of the length L of the tray. In some examples the subcompartment 23 may be between about 3" in length and about 5" in length and between about 6" in width to about 9" in width.

In some embodiments, the tray 12 may include slide doors. Slide doors may be adapted to mount a cell phone, yardage calculating device, rangefinder, swing analysis tool, swing aid, GPS device, scorecard and/or, by way of example, may provide access to an enclosed compartment of the tray 12 that slides out for access. Slide doors may include a mount that holds an attachment upright in easy line of sight. A mount may be considered an attachment 34 in some embodiments.

In some instances, the invention may be considered a self-contained portable tray for organizing tools and equipment. By way of example, tools and equipment may be golf equipment, such as, golf balls, golf tees, repair tools, yardage devices, boating tools, etc. The portable tray may be adapted to include compartments. The compartments may be filled with the tools and equipment such that the portable tray serves to organize and house the tools and equipment for easy transition from home to recreational vehicle and/or between more than one recreational vehicle.

Figure 9A:
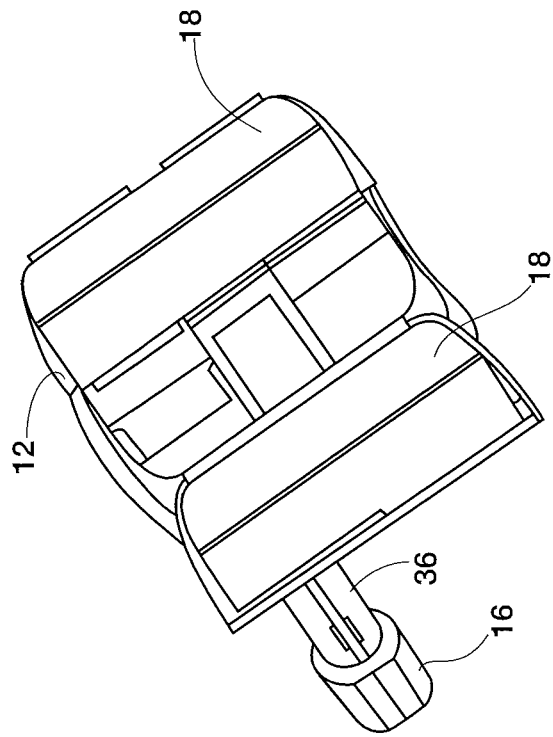
FIGS. 9A-D are various views of examples of a recreational vehicle accessory according to an embodiment of the disclosure.
Figure 9C:
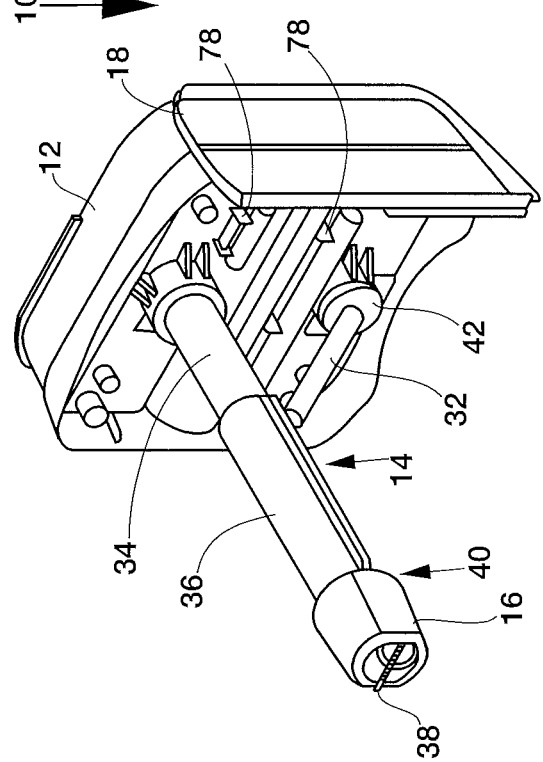
Figure 9B:
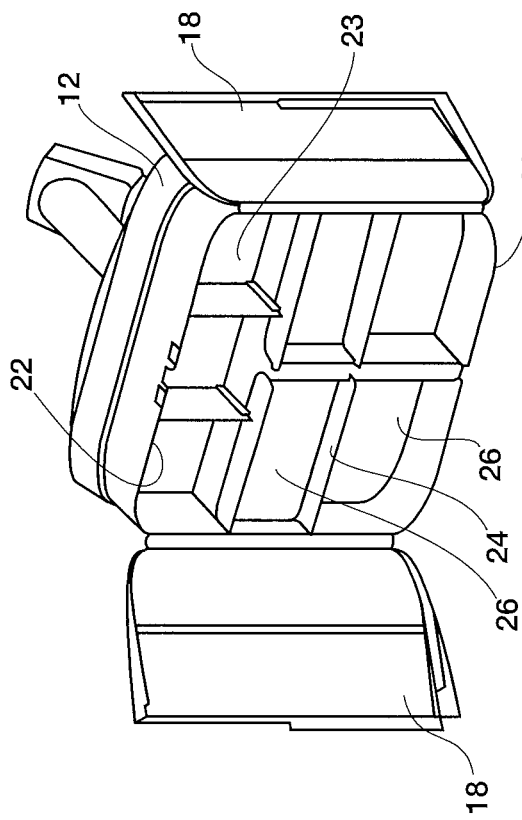
Figure 9D:
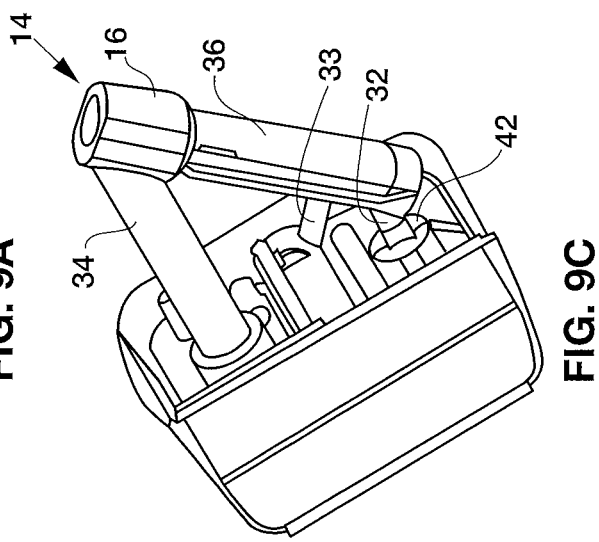
Figure 11C:
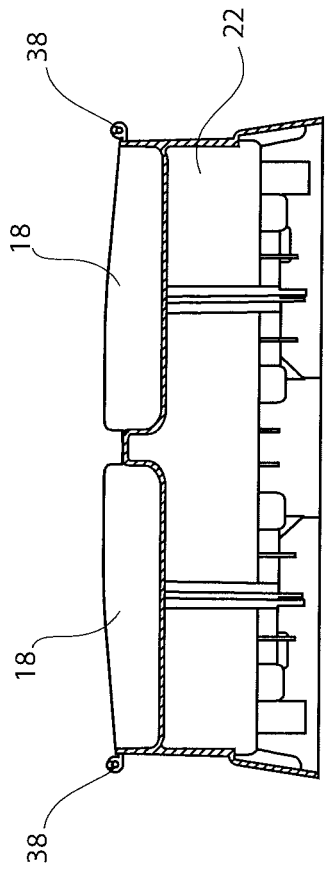
FIGS. 11A-D are bottom and side views of examples of a tray of a recreational vehicle accessory according to an embodiment of the disclosure.
Figure 11D:
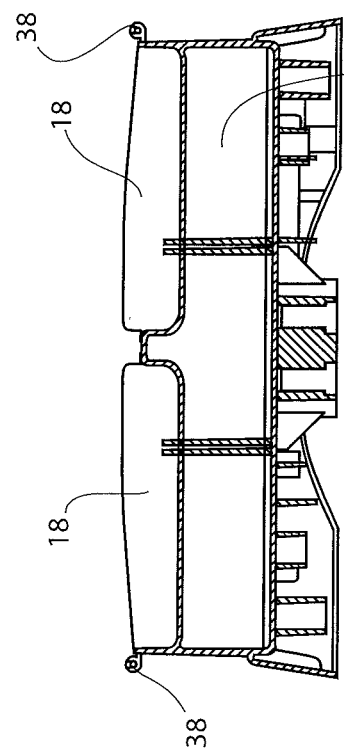
Figure 11B:
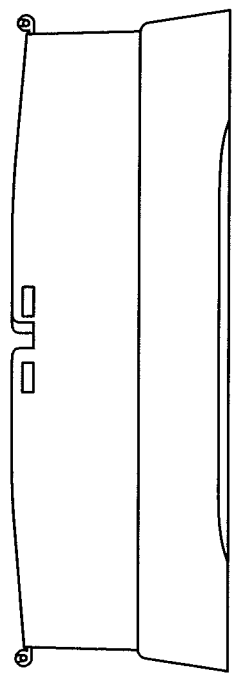
Figure 11A:
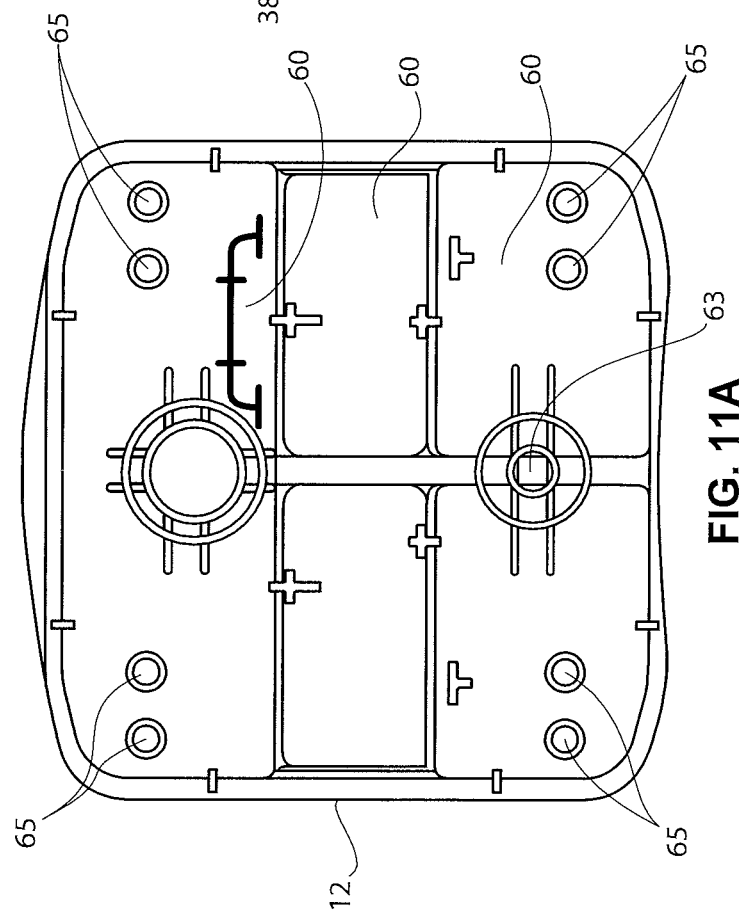

Recreational vehicle accessory 10 may include a tray 12, a cover 18 for the top of the tray 12, and an extension 14. The accessory 10 may include three variable positions, a first cup insert position, a second steering wheel mount position, and a third flush mount position, wherein the extension interfaces with the tray 12 differently in each of the three positions. In the first cup insert position, the extension 14 may attach with a bottom of the tray in a substantially perpendicular position, for example, being secured into interface 34' (see FIGS. 1 and 12B). In the second steering wheel mount position, the extension 14 may include a support 32. The extension 14 and support 32 may both attach substantially perpendicularly to a bottom of the tray 14 (see FIGS. 5, 9C and 12B). The extension 14 and support 32 may both attach to a lower portion 36 (see FIG. 15) at lower portion interface 64 and lower portion support interface 62 respectively. The lower portion support interface 62 may be an angled interface with a projection serving as and/or attaching to the support 32, and projecting away from the lower portion at the lower portion support interface 62 forming an attachment point (see FIGS. 11A, 15). The projection may be angled at an angle alpha of between 30 degrees and 55 degrees. The angle alpha may be a 45 degree angle formed between the lower portion 36 and the projection at the lower portion support interface 62. A wedge may be formed between the extension 14, a bottom of the tray 12 and the lower portion 36. The tray bottom may have a support recess 63 for securing and accepting the projection. In the third flush mount position, the tray 12 may be rested upon a substantially flat surface without the extension 14 attached, and/or one or more suction cups may be included for securing the tray 12 to a surface, with the suction cups attached facing the surface and secured to the bottom of the tray 12, for example at interface 65. The suction cups may be removable attached to the bottom of the tray 12.

The accessory 10 may include one assembly including a tray 12, a cover 18, an extension 14, a lower portion 36 (as in FIG. 9A) that linearly aligns with upper portion 34, and/or a lower portion 36 (as in FIG. 9C) that diagonally aligns with extension 34.

FIGS. 9A-D show yet other embodiments of accessory 10, including a tray 12 supported above an extension 14, the extension 14 attached to an adaptor 16 for securing the accessory.

The extension 14 may have an upper portion 34 and a lower portion 36. The upper portion 34 may fit with a bottom of the tray 12 on one end and interface with the adaptor 16 on the other end and/or, by way of example, may interface with the lower portion 34. The upper and lower portions 34, 36 may be, for example, an aluminum tube, a wood dowel, and/or a plastic tube. In some examples, the portions 34, 36 may be a thermoplastic material, for example injection molded ABS. The upper portion 34 may fit into the lower portion 36. The lower portion 36 may have a larger diameter than upper portion 24. Lower portion 36 may be continuous with and/or adjoin with adaptor 16.

Adaptor 16 may have a larger diameter than lower portion 36. Adaptor 16 may be configured to fit within a standard sized cup holder, particularly a cup holder of a recreational vehicle and/or a golf cart. The adaptor 16 may be of a thermoplastic material, and similarly to the lower portion 36, may include a rubberized material and may be expandable in diameter. Adaptor 16 may include a hinge pin 38. Adaptor 16 may also include a clamp upper 40. Adaptor 16 may narrow from a top outer side to a bottom outer side, the narrowing adaptor configured to mate with a cup holder, and/or cup holders of differing sizes. Upper portion 34 may extend through lower portion 36. Upper portion 34 may extend through adaptor 16.

The extension 14 may include a support 32. Support 32 may be an angled support anchoring to a bottom side of tray 12 on one end and to the extension 14 on an opposite end. Support 32, in some examples, may be an aluminum tube, a wood dowel, and/or a thermoplastic piece.

Figure 8:
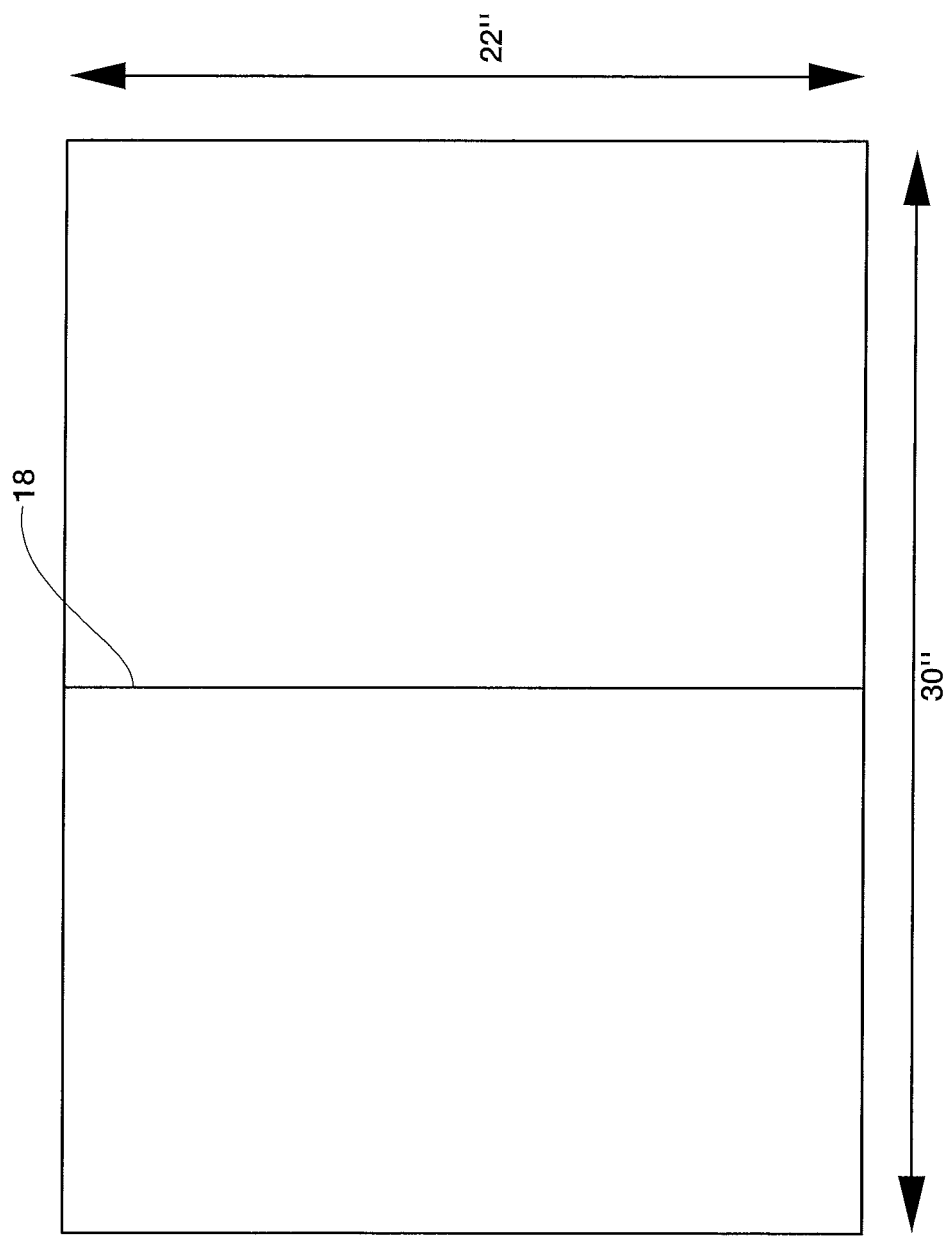
FIG. 8 is a top view of one example of a cover for a recreational vehicle accessory according to an embodiment of the disclosure.

Tray 12 may include a top side and a bottom side. Tray 12 may, for example, be at least partially injection molded ABS. Tray 12 may include a cover 18. Cover 18 may include one or more cover portions and/or be a divided cover (see FIG. 8). Cover 18 may be, for example, made similarly to the tray 12. Cover 18 may be hingedly attached to tray 12 (see FIG. 10). Tray 12 may include compartments. The compartments may be adjustable compartments. The compartments may include one or more pads.

FIGS. 10 and 11 show exemplary embodiments and configurations for tray 12 and cover 18, with FIG. 13 showing more detailed exemplary configurations and embodiments for cover 18, and specifically attachment of extension 14 with tray 12. FIG. 11A shows storage areas 60 recessed on the bottom side of tray 12 for storage of and locating extension 14 parts, by way of example upper portion 34 and lower portion 36, when extension parts 14 are not in use for mounting and/or stabilization of tray 12. The bottom side of tray 12 may include storage areas 60 that are configured to accept and completely recess extension 14 parts on the bottom of the tray 12 so that a portion of the bottom of the tray sits flush (and supports the tray) with a flat surface even when the extension parts are stored and recessed in the tray bottom.

The upper portion 34 and lower portion 36 may interface and fit with the tray 12 as shown in FIG. 12B with a bottom of the tray 12 at interface 34' and interface 36'. The interfaces 34', 36' may be swapped as needed and may be interchangeable. The upper portion and lower portion 34, 36 may be secured into the interface 34', 36'.

Figure 13B:
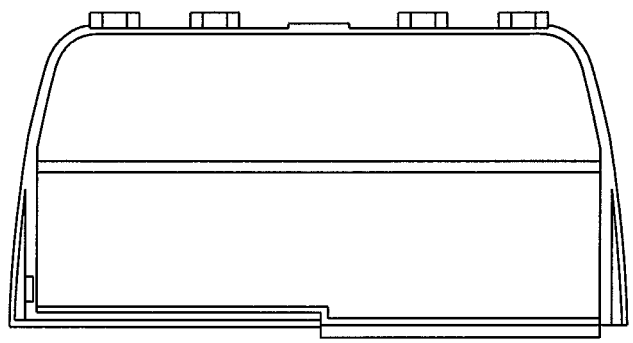
FIGS. 13A-13B are various views of one example of a cover of a recreational vehicle accessory according to an embodiment of the disclosure.
Figure 13A:
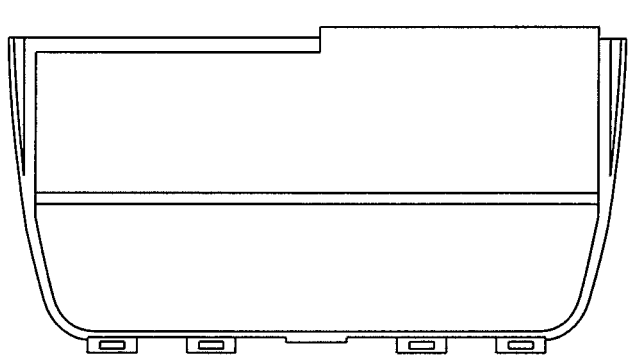

FIGS. 13A and 13B show one example of a design for a cover 18 according to the disclosure.

Figure 14C:
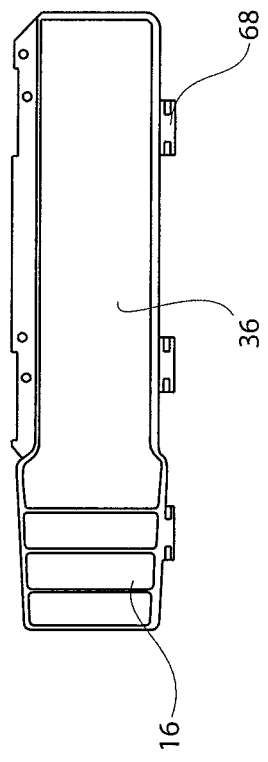
FIGS. 14-14C are various exploded views of examples of an extension of a recreational vehicle accessory according to an embodiment of the disclosure.
Figure 14B:
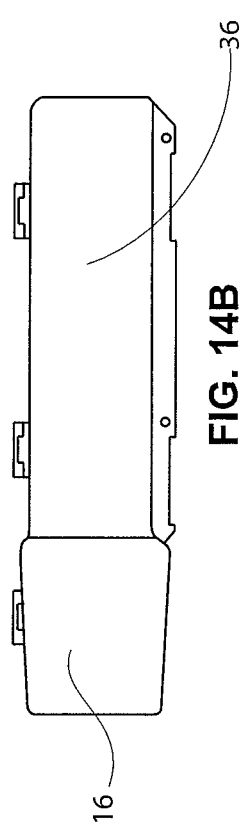
Figure 14A:
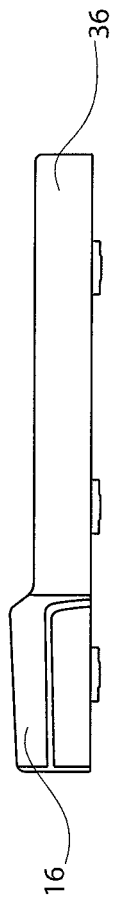
Figure 14:
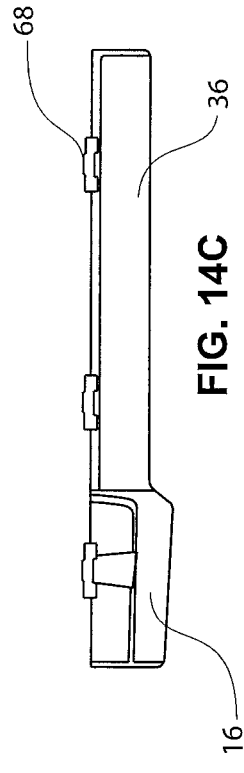
Figure 15:
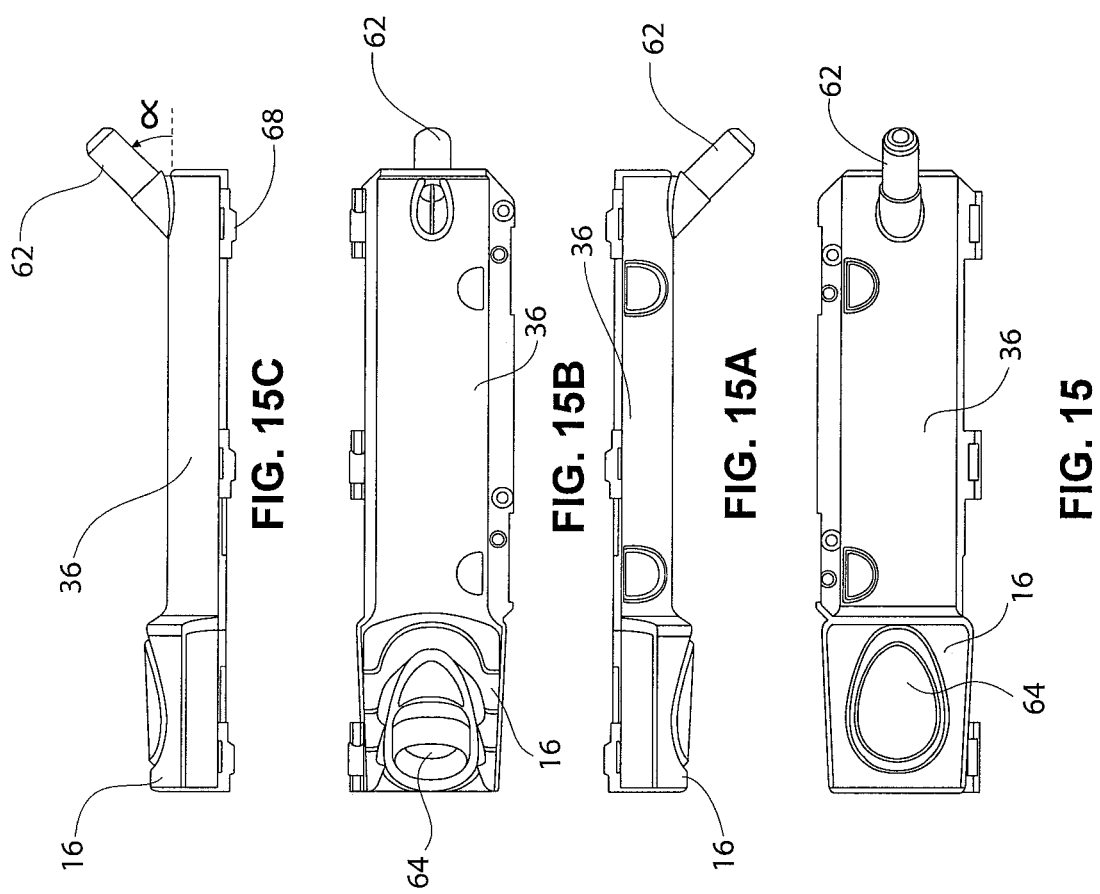
Figure 16:
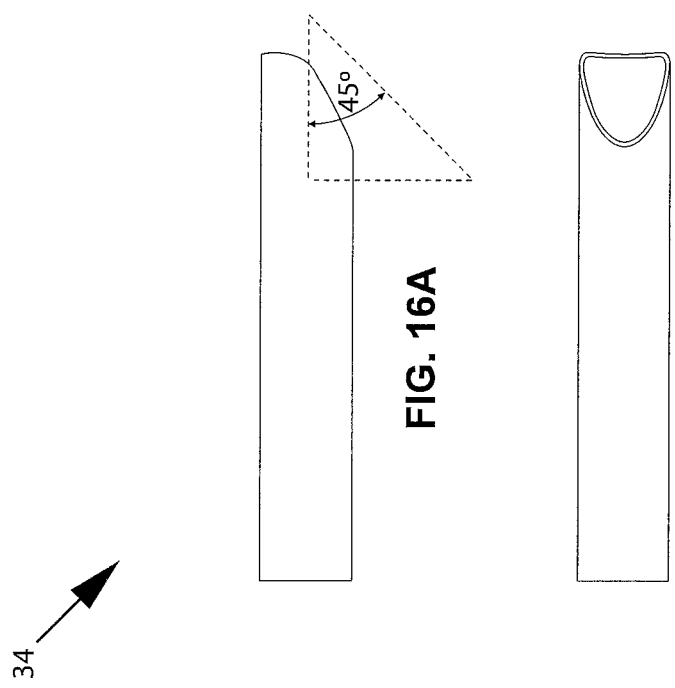

FIGS. 14, 15 and 16 show exemplary embodiments and dimensions for extension 14, specifically, FIGS. 14 and 15 show detailed examples of lower portion 36 and FIG. 16 shows a detailed example of upper portion 34. Lower portion 36 may be more than one assembled part. The lower portion 34 may include at least one latch 68 for latching together the more than one assembled part of lower portion 36. The lower portion 36 may be a first part and a second part that surround the upper portion 34 and then latch together to surround the upper portion.

Figure 17:
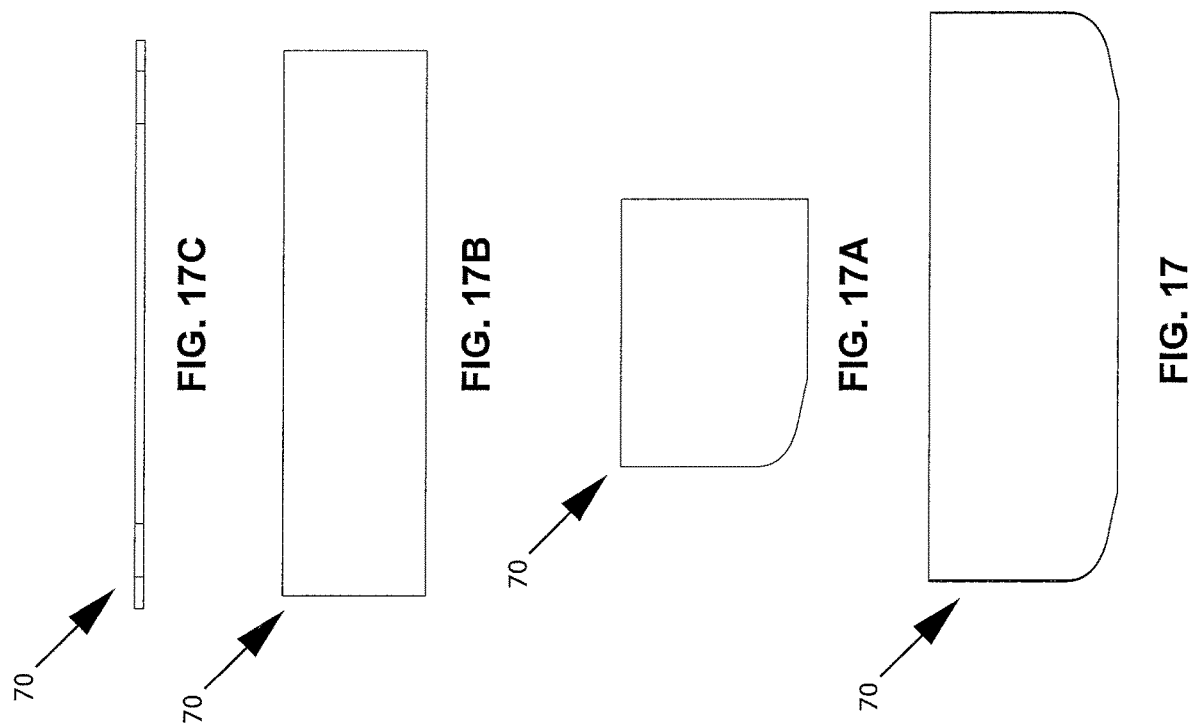

FIG. 17 shows exemplary embodiments and configurations for pads that may be included in the tray compartments for minimizing movement of items housed in the compartments. The pads 70 may take on the shape of the compartment in which it will be installed.

Figure 18:
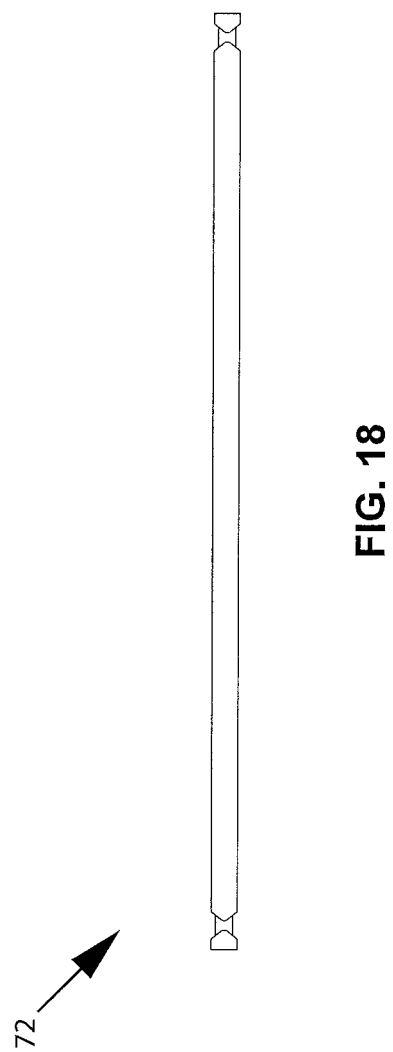
FIG. 18 is various views of example of a hinge pin configuration of a recreational vehicle accessory according to an embodiment of the disclosure.

FIG. 18 shows exemplary embodiments of the hinge pins 72 of tray 12. The hinge pins 72 may be utilized to secure different portions of the accessory 10 to one another.

Figure 19:
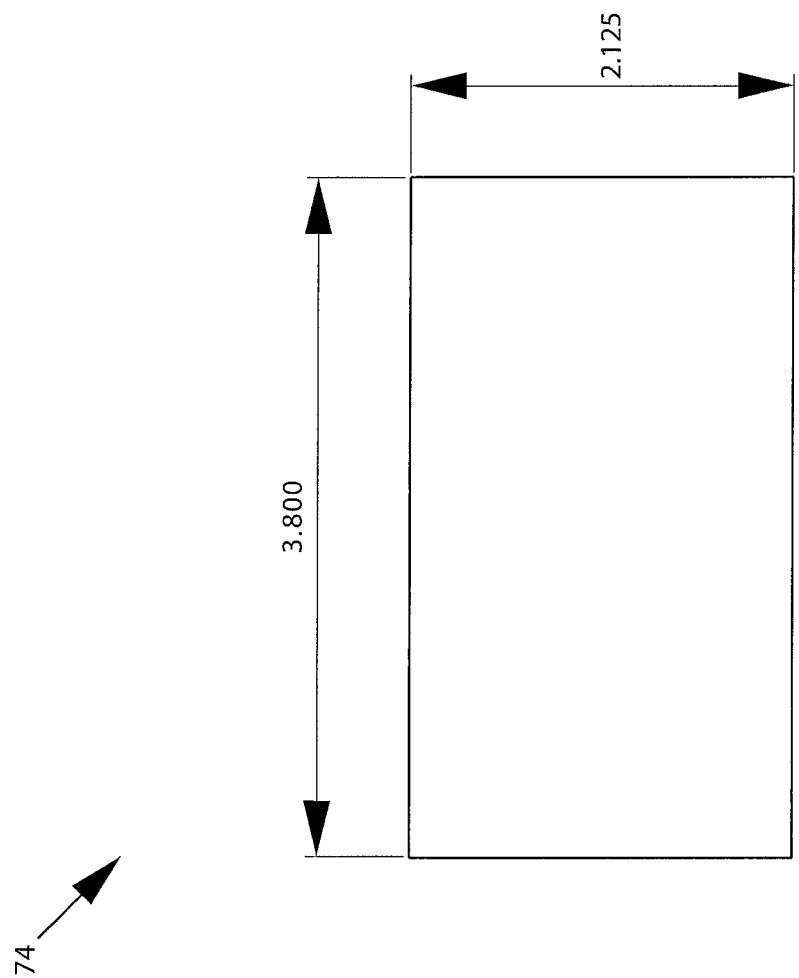
FIG. 19 is various views of one example of a partition of the tray of a recreational vehicle accessory according to an embodiment of the disclosure.

FIG. 19 shows exemplary embodiments of partitions 74 that may be used to divide tray compartments.

The accessory 10 may include a pivot bracket 78 and/or a set of pivot brackets. FIG. 20 shows exemplary embodiments of pivot bracket 78 located on the bottom of tray 12. Pivot bracket 78 may be configured to secure recessed accessory 10 parts within the recesses.

The invention may also be considered a method and system for an accessory 10 of any of the embodiments of the disclosure.

Also disclosed is an accessory kit. The accessory kit may include a tray 12, an extension, an adaptor and a compartment with variable compartment configurations. The kit may include versatile compartment partitions that are adapted to be configured to adjust a set of compartments to varying compartment sizes, for example varying compartments as disclosed. The kit may include any of the accessory parts as previously shown and described.

The invention may be considered a method for securing items between recreational vehicles and a user's residence by way of any of the embodiments disclosed herein for an accessory for a recreational vehicle 10.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A recreational vehicle accessory comprising:
    a. a horizontally oriented tray including a set of compartments on a top of said tray and a set of recesses on a bottom of said tray;
    b. a cover for covering the top of tray;
    c. a substantially vertically oriented extension, said extension having a length extending from a bottom of the tray and configured to separate said tray from an interface with a recreational vehicle; and
    d. an adaptor configured to secure within a standard size cup holder, the adaptor configured to interface with the recreational vehicle on one end and with said extension on a distal end of the adaptor to support said tray in a horizontal plane above a plane at the top of the cup holder, wherein said adaptor is expandable in diameter, and wherein said adaptor secures said accessory in a first position with said accessory variable between a first position wherein said extension is substantially vertical, a second steering wheel mount position wherein said extension is alternated to an angled position, and a third flush position wherein said extension is removed for said tray to mount about a steering wheel assembly directly.

2. The accessory of claim 1 wherein said set of compartments includes at least one full compartment spanning from a wall of said tray to another wall of said tray.

3. The accessory of claim 2 wherein said set of compartments includes at least two sub-compartments.

4. The accessory of claim 3 wherein said sub-compartments share a common dividing wall.

5. The accessory of claim 4 wherein said set of compartments includes a mid-size compartment.

6. The accessory of claim 5 wherein said cover is a divided cover.

7. The accessory of claim 1 wherein said extension is a support for securing said tray to said recreational vehicle.

8. The accessory of claim 7 wherein said support forms a wedge shaped support.

9. The accessory of claim 1 wherein said accessory is portable between recreational vehicles.

10. In a recreational vehicle, an accessory adapted to removably mate about said dashboard in said recreational vehicle, comprising:
    a. a tray having a set of compartments within said tray;
    b. a segmented cover fitted to the tray for covering the set of compartments;
    c. an extension extending downwardly from a bottom of the tray; and
    d. wherein said extension includes:
        i. an upper portion,
        ii. a lower portion fitted with the upper portion, and
        iii. an adaptor, wherein said adaptor interfaces with said recreational vehicle about said dashboard said adaptor configured to be separated into two sides to surround a steering wheel support and to secure around the steering wheel support,
    e. at least one latch, wherein at least a part of the extension is split into two sides that are mated to form an assembled extension.

11. The accessory of claim 10 wherein:
    a. said extension includes an extension length, and said extension length is between about 4" and about 20" in length,
    b. said tray is includes a tray length, and said tray length is between about 20" in length and about 35" in length,
    c. said tray includes a tray width and said tray width is between about 18" in width and about 26" in width, and
    d. said tray includes a tray depth, and said tray depth is between about 1" in depth and about 4" in depth.

12. The accessory of claim 10 including a support.

13. The accessory of claim 12 wherein said extension and said support attach substantially perpendicularly to a bottom of said tray.

14. The accessory of claim 13 wherein said extension and said support attach on their opposite ends to a lower portion.

15. The accessory of claim 14 including a lower portion support interface.

16. The accessory of claim 15 wherein said lower portion support interface is an angled interface.

17. A recreational vehicle accessory comprising:
    a. a horizontally oriented tray including a set of compartments on a top of said tray and a set of recesses on a bottom of said tray;
    b. a hinged cover for covering the top of tray;
    c. an extension for securely mounting said tray to a recreational vehicle, said extension having a length extending from a bottom of the tray and configured to separate said tray from an interface with a recreational vehicle, said extension including:
  i. an upper portion,
  ii. a lower portion fitted with the upper portion, and
  iii. an adaptor, wherein said adaptor interfaces with said recreational vehicle about the recreational vehicle dashboard on one end and with said extension on a second end,
d. wherein said accessory is securely mountable between three variable positions:
  i. a first cup insert position,
  ii. a second steering wheel mount position, and
  iii. a third flush mount position,
  iv. wherein the extension interfaces with the tray differently in each of the three positions.

* * * * *